(12) United States Patent
Someya

(10) Patent No.: US 10,536,677 B2
(45) Date of Patent: Jan. 14, 2020

(54) IMAGE PROCESSING APPARATUS AND METHOD

(71) Applicant: SONY CORPORATION, Tokyo (JP)

(72) Inventor: Kiyoto Someya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/086,600

(22) PCT Filed: Mar. 14, 2017

(86) PCT No.: PCT/JP2017/010109
§ 371 (c)(1),
(2) Date: Sep. 19, 2018

(87) PCT Pub. No.: WO2017/169725
PCT Pub. Date: Oct. 5, 2017

(65) Prior Publication Data
US 2019/0110032 A1    Apr. 11, 2019

(30) Foreign Application Priority Data

Mar. 28, 2016 (JP) .................. 2016-064243

(51) Int. Cl.
*H04N 9/31* (2006.01)
*H04N 5/74* (2006.01)

(52) U.S. Cl.
CPC ............ *H04N 9/3185* (2013.01); *H04N 5/74* (2013.01)

(58) Field of Classification Search
CPC ...... H04N 9/3185; H04N 5/74; H04N 9/3194; G06T 3/00; G03B 21/00; G09G 5/00
See application file for complete search history.

(56) References Cited

U.S. PATENT DOCUMENTS

2006/0038962 A1* 2/2006 Matsumoto ........... G06T 3/0006
                                                                353/69
2009/0115916 A1   5/2009 Kondo et al.
(Continued)

FOREIGN PATENT DOCUMENTS

| JP | 2009-135921 A | 6/2009 |
| JP | 2011-141600 A | 7/2011 |
| JP | 2015-118252 A | 6/2015 |

OTHER PUBLICATIONS

International Search Report and Written Opinion of PCT Application No. PCT/JP2017/010109, dated Jun. 6, 2017, 07 pages of English Translation and 07 pages of ISRWO.

(Continued)

*Primary Examiner* — Cara E Rakowski
*Assistant Examiner* — Danell L Owens
(74) *Attorney, Agent, or Firm* — Chip Law Group

(57) ABSTRACT

The present disclosure relates to an image processing apparatus and a method capable of performing on-line sensing without synchronizing and without using a specialized device. An image corner corresponding point detection unit detects an image corner of an input image from a captured image captured by a camera, and associates four image corner points of a corrected image to be projected by a projector with four image corner points of the detected captured image, thereby detecting four image corner corresponding points. An attitude estimation unit estimates a relative attitude of the projector and the camera from the four image corner corresponding points. The present disclosure can be applied to, for example, a projection imaging device that projects an image with a projector, captures the image projected by the projector, and updates a presentation position.

7 Claims, 14 Drawing Sheets

(56) References Cited

U.S. PATENT DOCUMENTS

2014/0340529 A1* 11/2014 Shibata ................ H04N 9/3185
                                                        348/189
2016/0366382 A1* 12/2016 Yoshida ............... H04N 9/3194

OTHER PUBLICATIONS

International Preliminary Report on Patentability of PCT Application No. PCT/JP2017/010109, dated Oct. 11, 2018, 07 pages of English Translation and 05 pages of IPRP.

* cited by examiner

IMAGE PROCESSING APPARATUS AND METHOD

CROSS REFERENCE TO RELATED APPLICATIONS

This application is a U.S. National Phase of International Patent Application No. PCT/JP2017/010109 filed on Mar. 14, 2017, which claims priority benefit of Japanese Patent Application No. JP 2016-064243 filed in the Japan Patent Office on Mar. 28, 2016. Each of the above-referenced applications is hereby incorporated herein by reference in its entirety.

TECHNICAL FIELD

The present disclosure relates to an image processing apparatus and a method, and more particularly, to an image processing apparatus and a method capable of performing on-line sensing without synchronizing and without using a specialized device.

BACKGROUND ART

In order to estimate an attitude of a projector (and a camera), it has been necessary to determine corresponding points between the projector (projection image) and the camera (captured image). In order to detect the corresponding points between the projector and the camera, it is necessary to capture the image to be projected by the projector with the camera. In a case of a still image (pattern image or still image picture), the same picture is continuously projected, whereby a desired image can be captured, and the corresponding points can be detected even in a case where an imaging timing is random.

For example, with respect to on-line sensing, which is a technique for determining corresponding points while projecting images of a content or the like, corresponding points can be detected while input pictures are projected, whereby a picture presentation position can be updated to a correct picture presentation position even in a case where an attitude of the projector changes due to an external disturbance (see Patent Document 1).

CITATION LIST

Patent Document

Patent Document 1: Japanese Patent Application Laid-Open No. 2009-135921

SUMMARY OF THE INVENTION

Problems to be Solved by the Invention

However, with regard to a moving image, contents of an image change in each frame. Accordingly, it has been necessary to synchronize the projection of the projector and the imaging of the camera to detect the corresponding points.

Supplementarily, with the use of light other than visible light, such as an IR light source, an IR pattern can be made a still image, for example, whereby on-line sensing can be performed without synchronizing. However, an additional device, that is, a projector or a projector with an IR light source, has been required.

The present disclosure has been conceived in view of the above, and it becomes possible to perform on-line sensing without synchronizing and without using a specialized device.

Solution to Problems

An image processing apparatus according to one aspect of the present technology includes: a correction unit that generates a corrected image by correcting an input image on the basis of attitude estimation information indicating an attitude estimation result of a projector; an image corner correspondence detection unit that detects image corner corresponding points by associating an image corner point of a captured image with an image corner point of the corrected image, the captured image being generated in such a manner that the corrected image corrected by the correction unit is projected by the projector and a projection image is captured; and an attitude estimation unit that generates the attitude estimation information by estimating an attitude of the projector on the basis of the image corner corresponding points detected by the image corner correspondence detection unit.

The image processing apparatus may further include an imaging unit that generates the captured image by capturing the projection image that is the corrected image corrected by the correction unit and projected by the projector.

An imaging trigger control unit may be further included. The imaging trigger control unit performs a read ahead of the input image and transmits an imaging trigger to the imaging unit in a case where an image frame can be detected.

A black band detection unit that detects a black band in the input image may be further included. In a case where the black band is detected by the black band detection unit, the image corner point of the corrected image is determined from a region other than the black band.

In a case where there are less than four image corner points of the corrected image, the attitude estimation unit may estimate the attitude of the projector by evaluating a degree of matching between an image frame of the corrected image and an image frame of the captured image.

The attitude estimation unit may estimate the attitude of the projector by evaluating, as the evaluation of the degree of matching, a proximity degree of parameters of straight lines indicating the image frame.

The attitude estimation unit may estimate the attitude of the projector by matching, as the evaluation of the degree of matching, edge points in the image frame between an image to be obtained by capturing the corrected image by the imaging unit using the attitude estimation information and the captured image.

A method of processing image according to one aspect of the present technology using an image processing apparatus includes: generating a corrected image by correcting an input image on the basis of attitude estimation information indicating an attitude estimation result of a projector; detecting image corner corresponding points by associating an image corner point of a captured image with an image corner point of the corrected image, is the captured image being generated in such a manner that the corrected image is projected by the projector and a projection image is captured; and generating the attitude estimation information by estimating an attitude of the projector on the basis of the detected image corner corresponding points.

According to one aspect of the present technology, a corrected image is generated by correcting an input image on the basis of attitude estimation information indicating an attitude estimation result of a projector, image corner corresponding points are detected by associating an image corner point of a captured image with an image corner point of the corrected image, the captured image being generated in such a manner that the corrected image is projected by the projector and a projection image is captured, and the attitude estimation information is generated by estimating an attitude of the projector on the basis of the detected image corner corresponding points.

Effects of the Invention

According to the present technology, it is possible to perform on-line sensing without synchronizing and without using a specialized device.

It should be noted that the effects described in the present specification are merely examples. The effects of the present technology are not limited to the effects described in the present specification and additional effects may be included.

MODE FOR CARRYING OUT THE INVENTION

Hereinafter, embodiments for carrying out the present disclosure (hereinafter referred to as embodiments) will be described.
<Background>
In order to estimate an attitude of a projector and a camera, it is necessary to detect corresponding points between the projector and the camera. This corresponding point detection processing is generally called structured light (SL).

Figure 1:
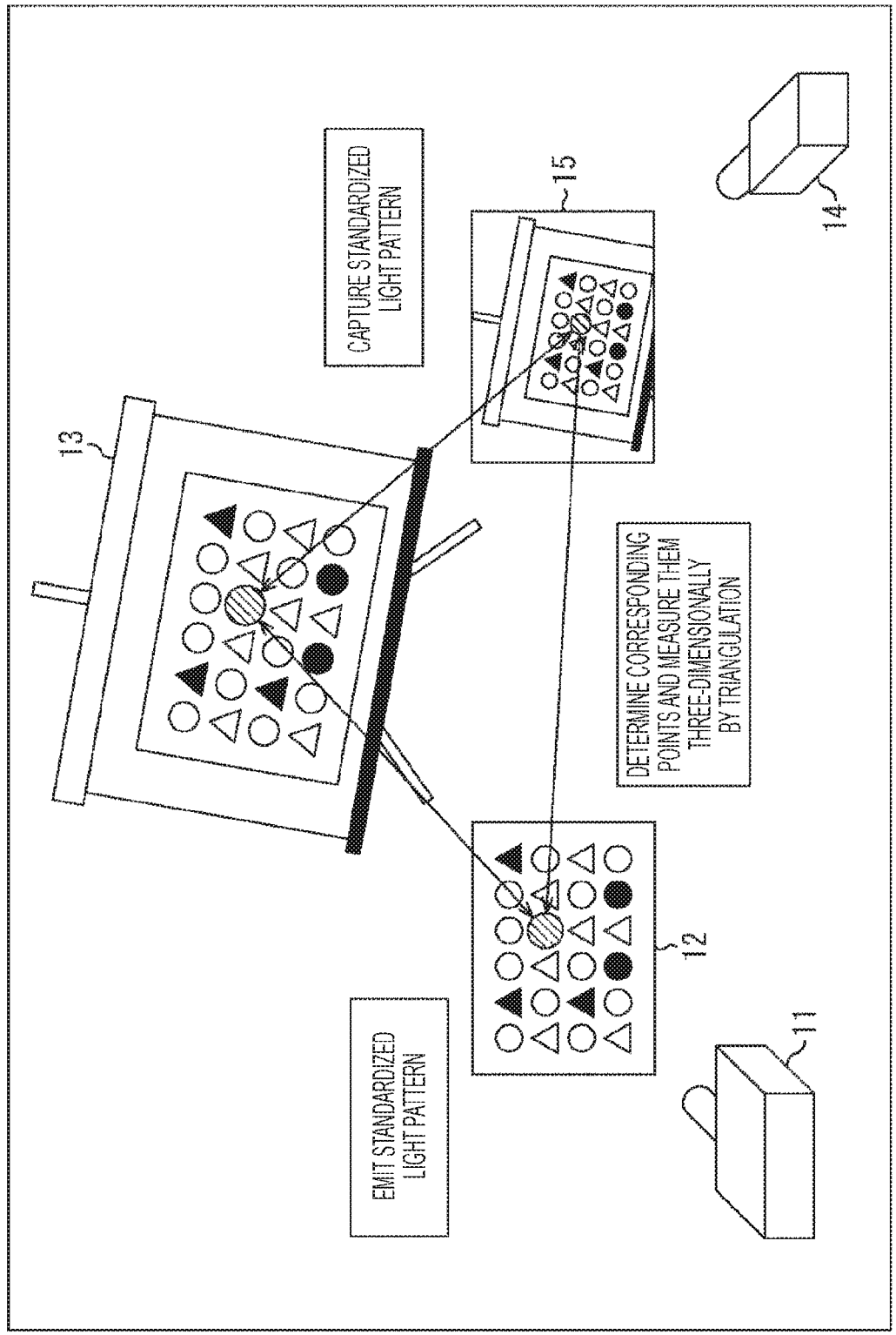
FIG. 1 is a diagram illustrating an example of a detection of corresponding points.

For example, as exemplified in FIG. 1, a standardized light pattern 12 of a predetermined picture pattern is projected by a projector 11 onto a screen 13, and the projected standardized light pattern 12 is captured by a camera 14, thereby acquiring a captured image 15. Then, the corresponding points between the standardized light pattern 12 and the captured image 15 are determined on the basis of the picture pattern of the standardized light pattern 12, the attitude (positional relationship) of the projector 11 and the camera 14, a shape of the screen 13, and the like are determined by triangulation or the like, on the basis of the corresponding points, whereby the attitude of the projector and the camera can be estimated on the basis of the result.

In this manner, in order to detect the corresponding points between the projector and the camera, it is necessary to capture an image (pattern image such as gray code, dot, and checker, input image, and the like) to be projected by the projector with the camera. In a case of a still image (pattern image or still image picture), the same picture is continuously projected, whereby a desired image can be captured, and the corresponding points can be detected without matching an imaging timing.

A method of estimating the attitude of the projector and the camera by detecting the corresponding points while a moving image is being projected will be called on-line sensing. Examples of the corresponding point detection of the on-line sensing include an imperceptible structured light (FIG. 2) that performs the corresponding point detection by superimposing, in moving images, patterns that are not perceived by human eyes, and a method of associating feature points after detecting the feature points in moving images (FIG. 3).

An ISL method is a technique in which a structured light pattern, which is an image having a predetermined pattern, is subject to a positive/negative inversion, embedded in a projection image, and projected in such a manner that the structured light pattern is not perceived by human beings.

Figure 2:
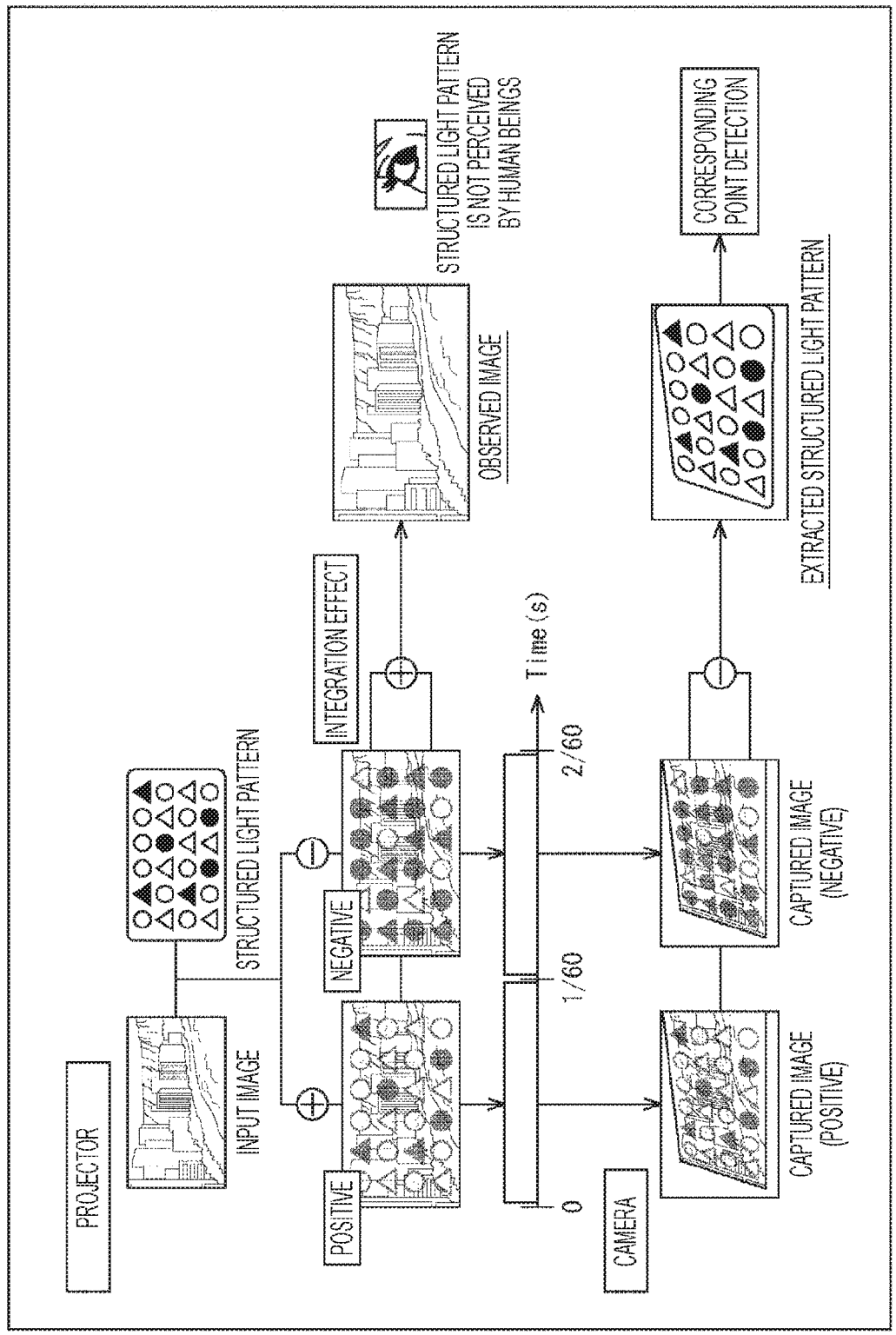
FIG. 2 is a diagram illustrating an example of an ISL.
Figure 3:
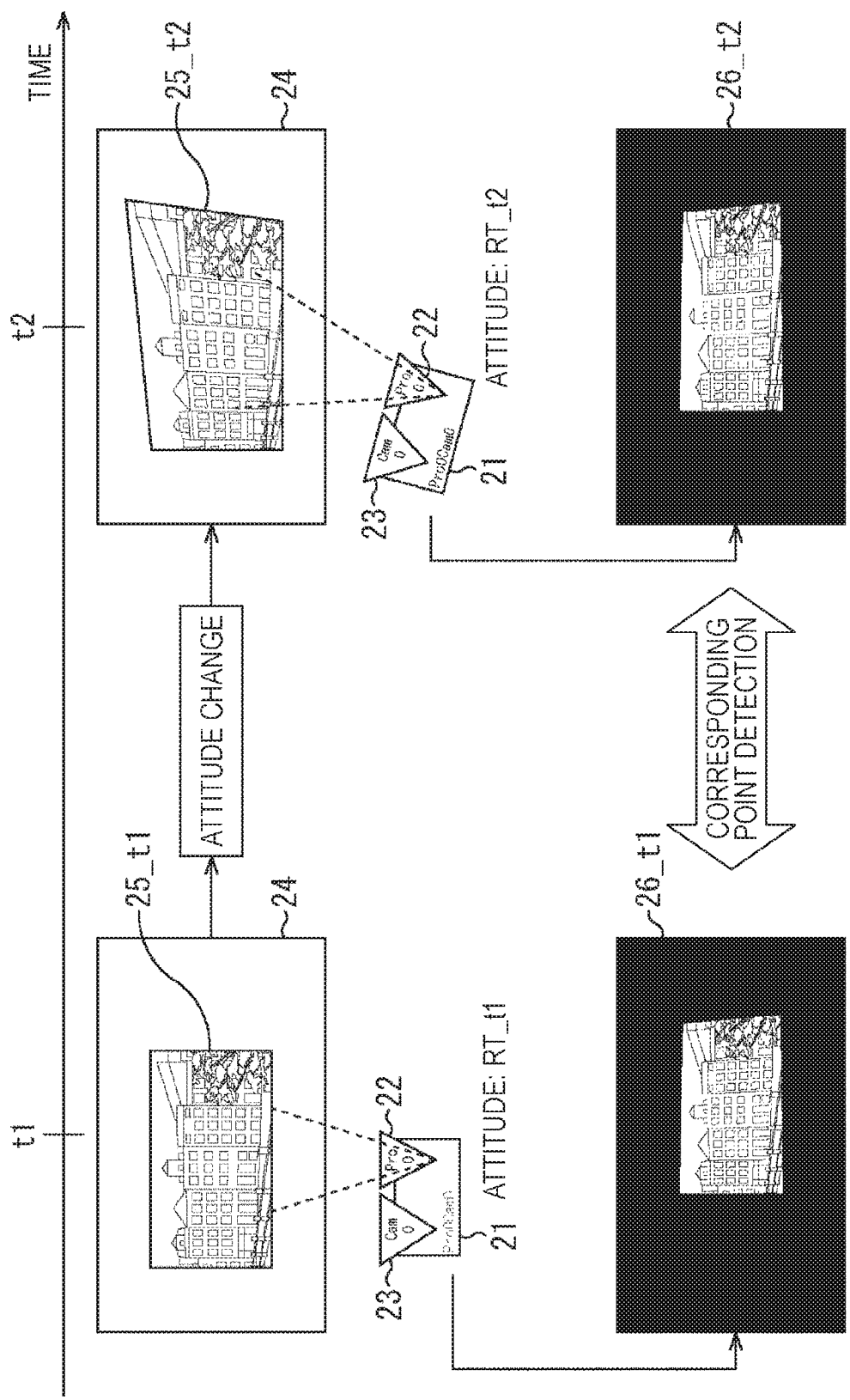
FIG. 3 is a diagram illustrating a method of associating feature points in moving images.

As illustrated in FIG. 2, the projector generates a frame image in which a positive image of the structured light pattern is combined with the input image by adding a predetermined structured light pattern to a certain frame of the input image, and generates a frame image in which a negative image of the structured light pattern is combined with the input image by subtracting the structured light pattern for the next frame of the input image. Then, the projector continuously projects those frames. The positive and negative two frames switched at high speed are perceived by human eyes in such a manner that the two frames are added to each other due to an integration effect. As a result, it becomes difficult for a user viewing the projection image to perceive the structured light pattern embedded in the input image.

On the other hand, the camera captures the projection image of those frames and determines a difference between the captured images of both frames, thereby extracting only the structured light pattern included in the captured image. The corresponding point detection is performed using the extracted structured light pattern.

In this manner, according to the ISL method, the structured light pattern can be easily extracted simply by determining the difference between the captured images, whereby the corresponding point detection can be performed with stable accuracy without depending on the image to be projected.

As illustrated in FIG. 3, there is also a method in which feature points in moving images are detected and the feature points are associated with each other thereafter. At a time point t1, the projector (projection unit) 22 and the camera (imaging unit) 23 of the projection imaging device 21 are in an attitude RT_t1. At this time, the projector 22 projects a projection image 25_t1 onto a screen 24, and the camera 23 captures the projection image 25_t1 to generate a captured image 26_t1.

Subsequently, at a time point t2, the attitude of the projector (projection unit) 22 and the camera (imaging unit) 23 of the projection imaging device 21 is changed, and the projector (projection unit) 22 and the camera (imaging unit) 23 of the projection imaging device 21 are in an attitude RT_t2. At this time, the projector 22 projects a projection image 25_t2 onto the screen 24, and the camera 23 captures the projection image 25_t2 to generate a captured image 26_t2.

As described above, since the corresponding points are detected with respect to the captured image 26_t1 at the generated time point t1 and the captured image 26_t2 at the time point t2 while the input picture is being projected, there is an advantage that a picture presentation position can be automatically updated to a correct picture presentation position even in a case where the attitude of the projector changes due to an external disturbance. (It is not necessary to project the pattern image described above).

However, with regard to a moving image, contents of an image change in each frame. Accordingly, it is necessary to synchronize the projection of the projector and the imaging of the camera to detect the corresponding points. Here, supplementarily, with the use of light other than visible light, such as an IR source, an IR pattern can be made a still image, whereby the on-line sensing can be performed without synchronizing. However, a projector or a projector with an IR light source becomes necessary.

In view of the above, in the present technology, corresponding points are detected at four corners of an image, an attitude is estimated on the basis of the corresponding points, and an input image is corrected on the basis of the estimated attitude information, whereby on-line sensing can be performed without using a specialized device in which a projector and a camera are synchronized with each other.

<Exemplary Configuration of Projection Imaging Device>

Figure 4:
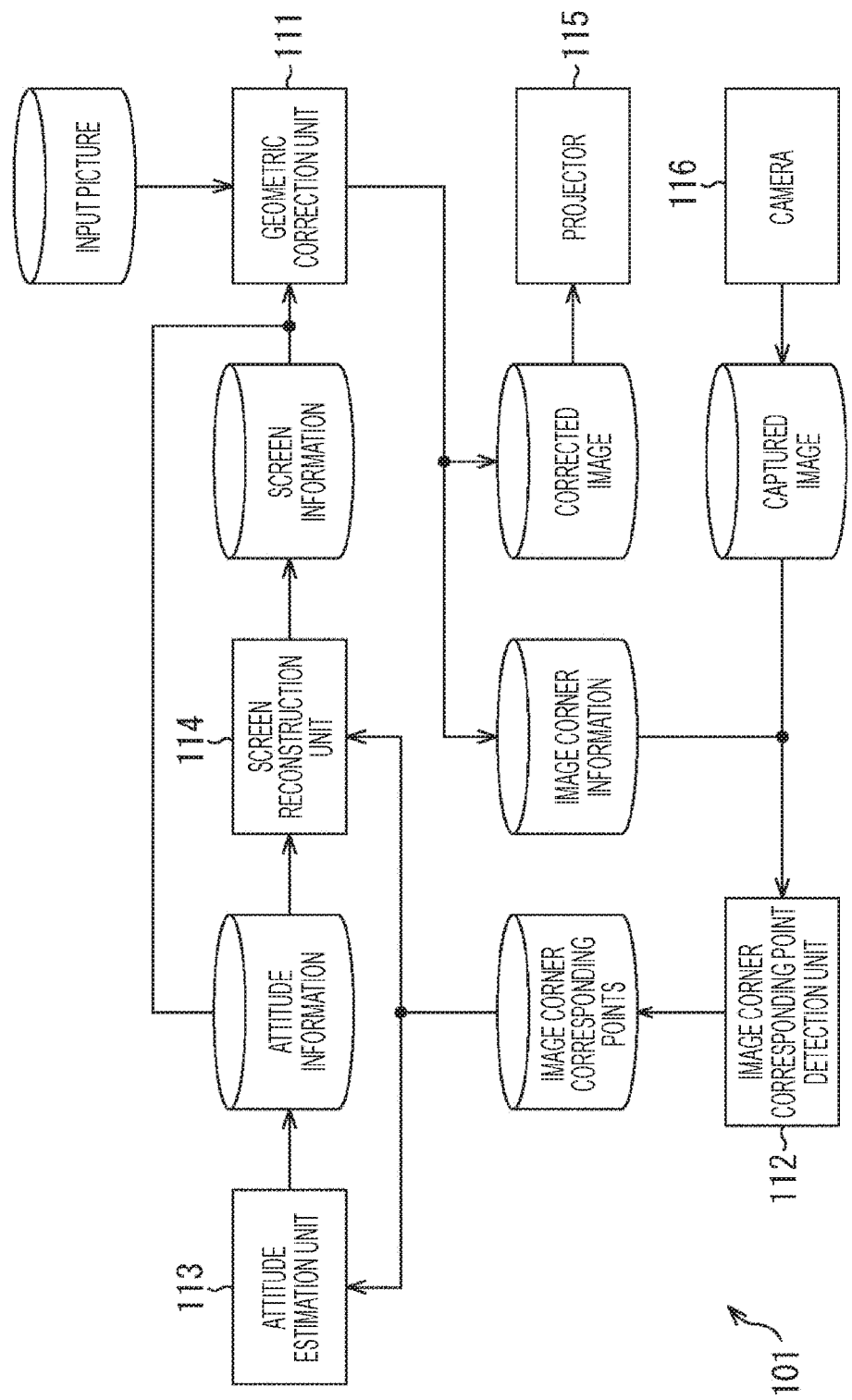
FIG. 4 is a block diagram illustrating an exemplary configuration of a projection imaging device to which the present technology is applied.

FIG. 4 is a block diagram illustrating an exemplary configuration of the projection imaging device to which the present technology is applied.

In the example of FIG. 4, a projection imaging device 101 includes a geometric correction unit 111, an image corner corresponding point detection unit 112, an attitude estimation unit 113, a screen reconstruction unit 114, a projector 115, and a camera 116. An input picture is input to the geometric correction unit 111.

The geometric correction unit 111 corrects the input picture, corrects the input picture using attitude information and plane screen information of the projector in such a manner that the input picture is correctly viewed, generates a corrected image, and outputs the generated corrected image to the projector 115. At that time, the geometric correction unit 111 determines the points of the corrected image that correspond to four image corner points of the input picture, and supplies those points to the image corner corresponding point detection unit 112 as image corner information.

For example, in a case where the input picture is projected by the projector 115 as it is without being geometrically corrected, such as at the start of projection, the four corner points at the projector resolution become the image corner information. Specifically, in a case where the resolution of the projector 115 is 1280×720 resolution, the image corner information is [0, 0], [0, 1280], [1280, 720], and [0, 720]. On the other hand, in a case where the input picture is projected after being geometrically corrected in such a manner that the input picture is correctly viewed, as illustrated in FIG. 5, the image corner information exists inside the corrected image.

Figure 5:
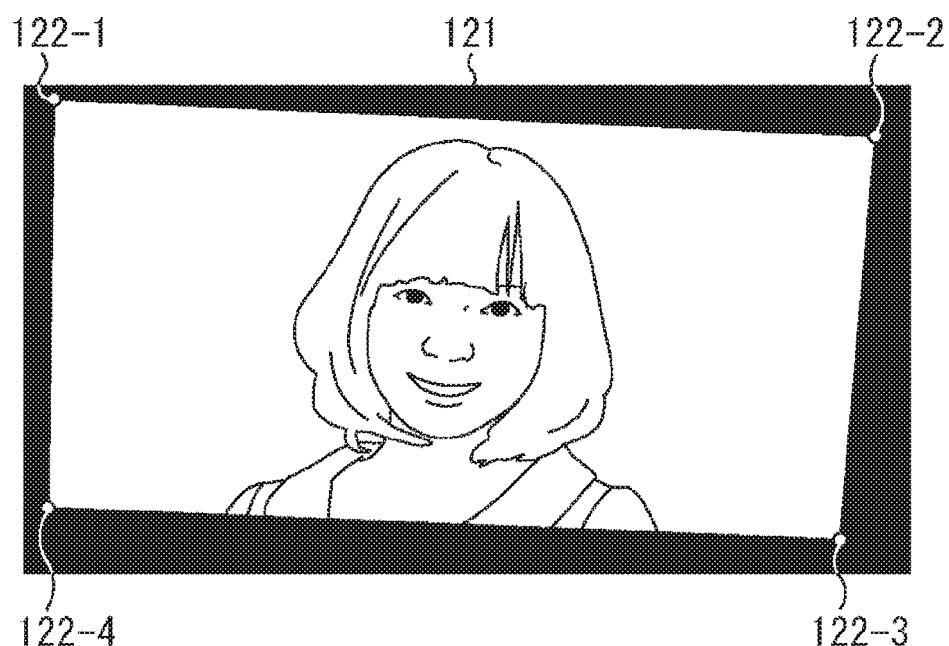
FIG. 5 is a view illustrating an example of a corrected image and image corner information.

FIG. 5 illustrates a corrected image 121, and image corners 122-1 to 122-4 positioned therein are the image corner information.

The projector 115 projects the corrected image onto the screen.

The camera 116 captures the projection image projected onto the screen from the projector 115, generates a captured image, and supplies the captured image to the image corner corresponding point detection unit 112.

Incidentally, the projector 115 and the camera 116 may be plural. In addition, one camera 116 may be provided for the projector 115, one camera 116 may be provided for a plurality of the projector 115, or a plurality of the cameras 116 may be provided for one projector 115.

Figure 7:
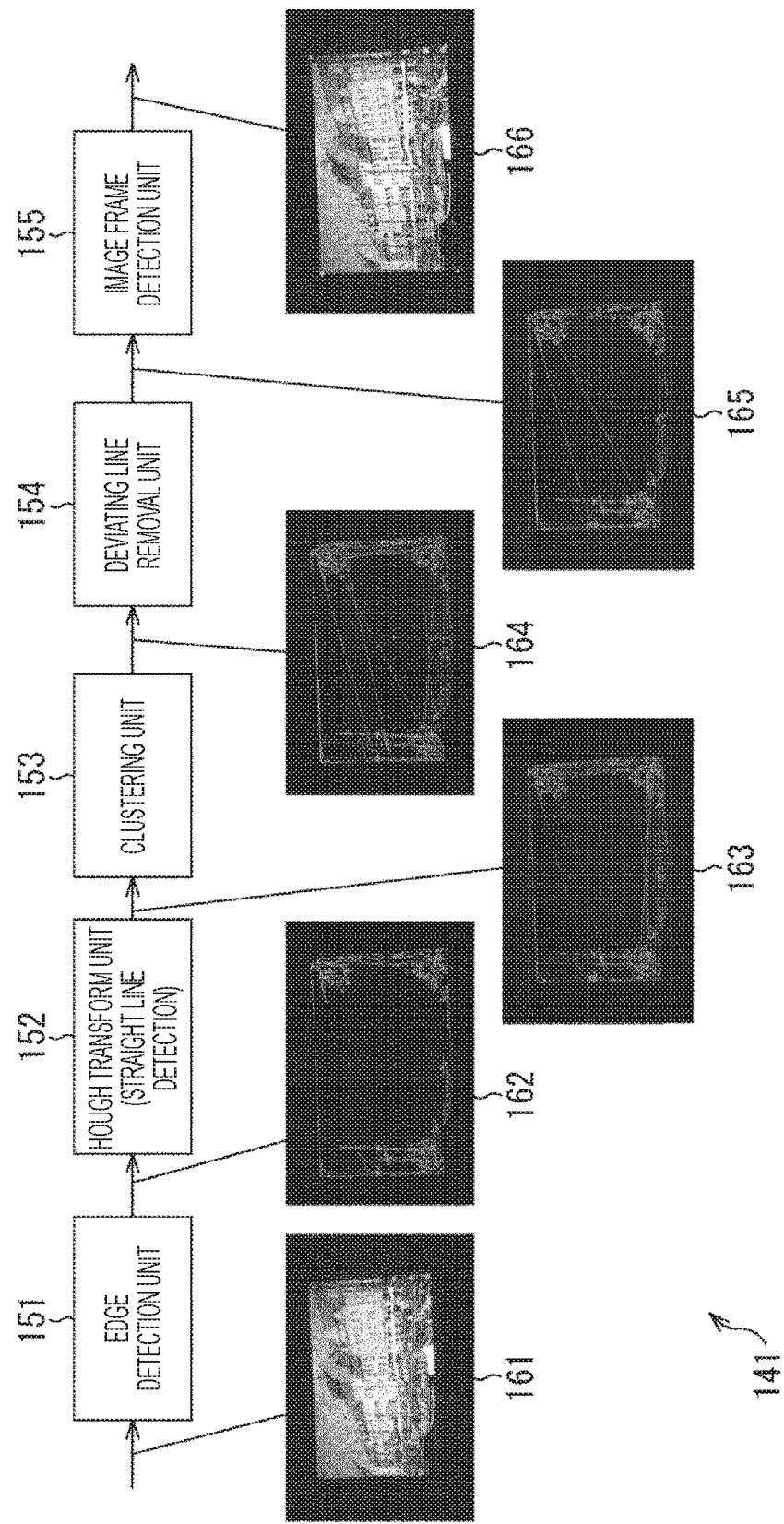
FIG. 7 is a block diagram illustrating an exemplary configuration of an image corner detector.

The image corner corresponding point detection unit 112 detects the image corner of the input image from the captured image captured by the camera 116. Examples of the method of image corner detection include, as illustrated in FIG. 7 to be described later, a method in which four image frames of the input picture are detected by Hough transform or the like and an intersection point of two image frame straight lines is set to be an image corner. Then, the image corner corresponding point detection unit 112 associates four image corner points of the corrected image to be projected by the projector 115 with four image corner points of the captured image captured by the camera 116, thereby detecting four image corner corresponding points.

Figure 6:
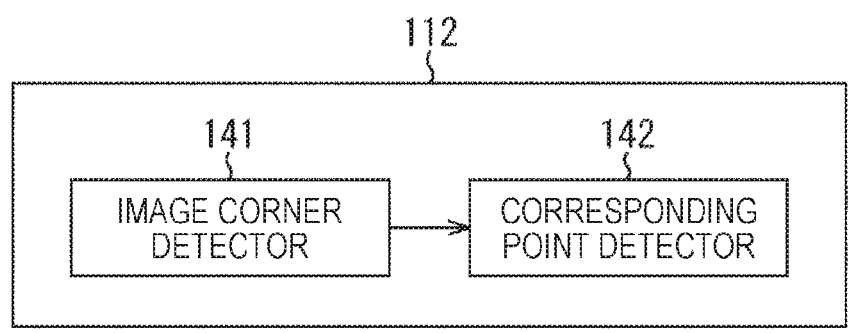
FIG. 6 is a block diagram illustrating an exemplary configuration of an image corner corresponding point detection unit.

FIG. 6 is a block diagram illustrating an exemplary configuration of an image corner corresponding point detection unit.

In the example of FIG. 6, the image corner corresponding point detection unit 112 includes an image corner detector 141 and a corresponding point detector 142.

The image corner detector 141 detects the image corners of the input image from the captured image captured by the camera 116, and supplies the detected four image corners from the captured image to the corresponding point detector 142.

The corresponding point detector 142 associates four image corner points of the corrected image to be projected to the projector 115 with the four image corner points of the captured image captured by the camera 116, thereby detecting four image corner corresponding points. The corresponding point detector 142 supplies the detected four image corner corresponding points to the attitude estimation unit 113 and the screen reconstruction unit 114.

FIG. 7 is a block diagram illustrating an exemplary configuration of an image corner detector.

In the example of FIG. 7, the image corner detector 141 includes an edge detection unit 151, a Hough transform unit 152, a clustering unit 153, a deviating line removal unit 154, and an image frame detection unit 155.

A captured image 161 captured by the camera 116 is input to the edge detection unit 151. The edge detection unit 151 detects an edge from the captured image 161, generates an edge detection image 162, and supplies the generated edge detection image 162 to the Hough transform unit 152.

The Hough transform unit 152 performs Hough transform on the edge detection image 162, and performs straight line detection. The Hough transform unit 152 generates a Hough-transformed image 163, and supplies the generated Hough-transformed image 163 to the clustering unit 153.

The clustering unit 153 performs a class classification of the straight lines detected in the Hough-transformed image 163, and supplies a clustered image 164 to the deviating line removal unit 154. The deviating line removal unit 154 removes, within the clustered image 164, straight lines that do not fall into the class classification, and supplies an image 165 after the deviating line removal to the image frame detection unit 155.

The image frame detection unit 155 detects the image frame straight line from the image 165 after the deviating line removal. The image frame detection unit 155 further detects the four image corners of the input picture with the intersection point of the two image frame straight lines set as an image corner, and outputs an image 166 in which the image corner is detected to the corresponding point detector 142.

Figure 8:
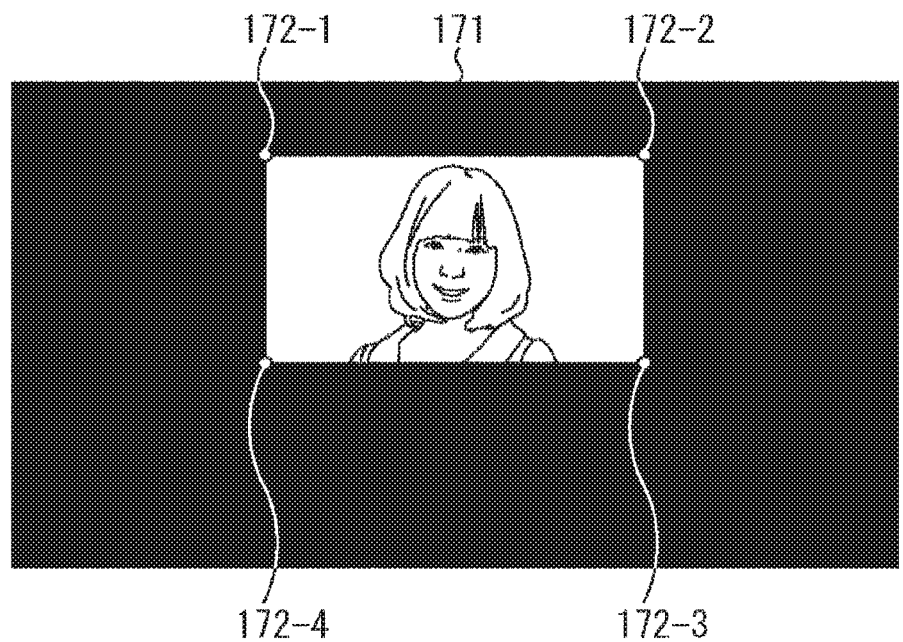
FIG. 8 is a view illustrating an example of a captured image and the image corner information.

FIG. 8 illustrates a captured image 171, and image corners 172-1 to 172-4 positioned therein are the image corner information.

The attitude estimation unit 113 estimates a relative attitude of the projector 115 and the camera 116 from the four image corner corresponding points, and supplies the estimated attitude information of the projector to the screen reconstruction unit 114 and the geometric correction unit 111.

The screen reconstruction unit 114 performs screen shape estimation and position alignment with the plane screen by referring to the four image corner corresponding points and the attitude information, and supplies the result to the geometric correction unit 111 as screen information.

Figure 9:
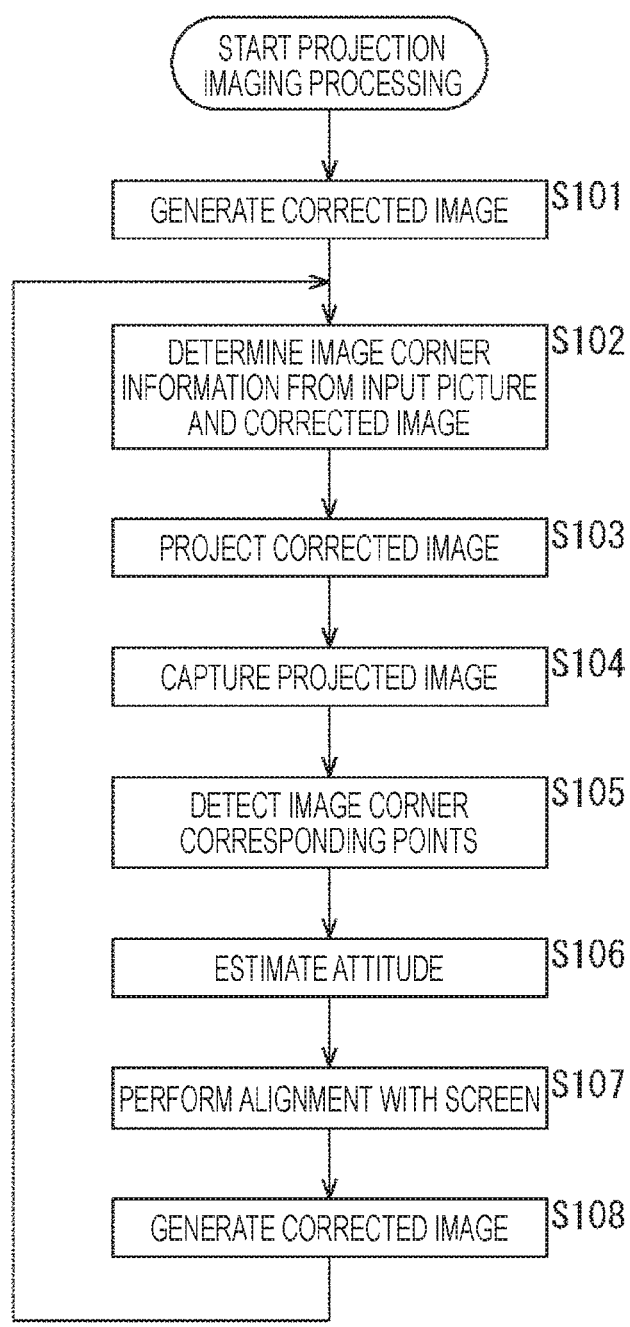
FIG. 9 is a flowchart illustrating a projection imaging processing of the projection imaging device.

Next, projection imaging processing of the projection imaging device 101 will be described with reference to the flowchart of FIG. 9. Note that the process chart of FIGS. 10A, 10B, 10C, and 10D will be referenced as necessary in the descriptions of FIG. 9.

In step S101, the geometric correction unit 111 corrects the input picture, corrects the input picture using the attitude information and the plane screen information of the projector in such a manner that the input picture is correctly viewed, and generates a corrected image.

At that time, in step S102, the geometric correction unit 111 determines the points of the corrected image that correspond to the four image corner points of the input picture, and supplies the determined points to the image corner corresponding point detection unit 112 as the image corner information. Here, for example, in a case where the input picture is projected by the projector 115 as it is without being geometrically corrected, such as at the start of projection, the four corner points at the projector resolution are the image corner information.

Since the geometric correction unit 111 outputs the generated corrected image to the projector 115, in step S103, the projector 115 projects the corrected image onto the screen.

In step S104, the camera 116 captures the projection image projected onto the screen from the projector 115, generates a captured image, and supplies the captured image to the image corner corresponding point detection unit 112.

The image corner corresponding point detection unit 112 detects the image corner of the input image from the captured image captured by the camera 116. Then, in step S105, the image corner corresponding point detection unit 112 associates the four image corner points of the corrected image to be projected to the projector 115 with the four image corner points of the captured image captured by the camera 116, thereby detecting four image corner corresponding points.

Figure 10:
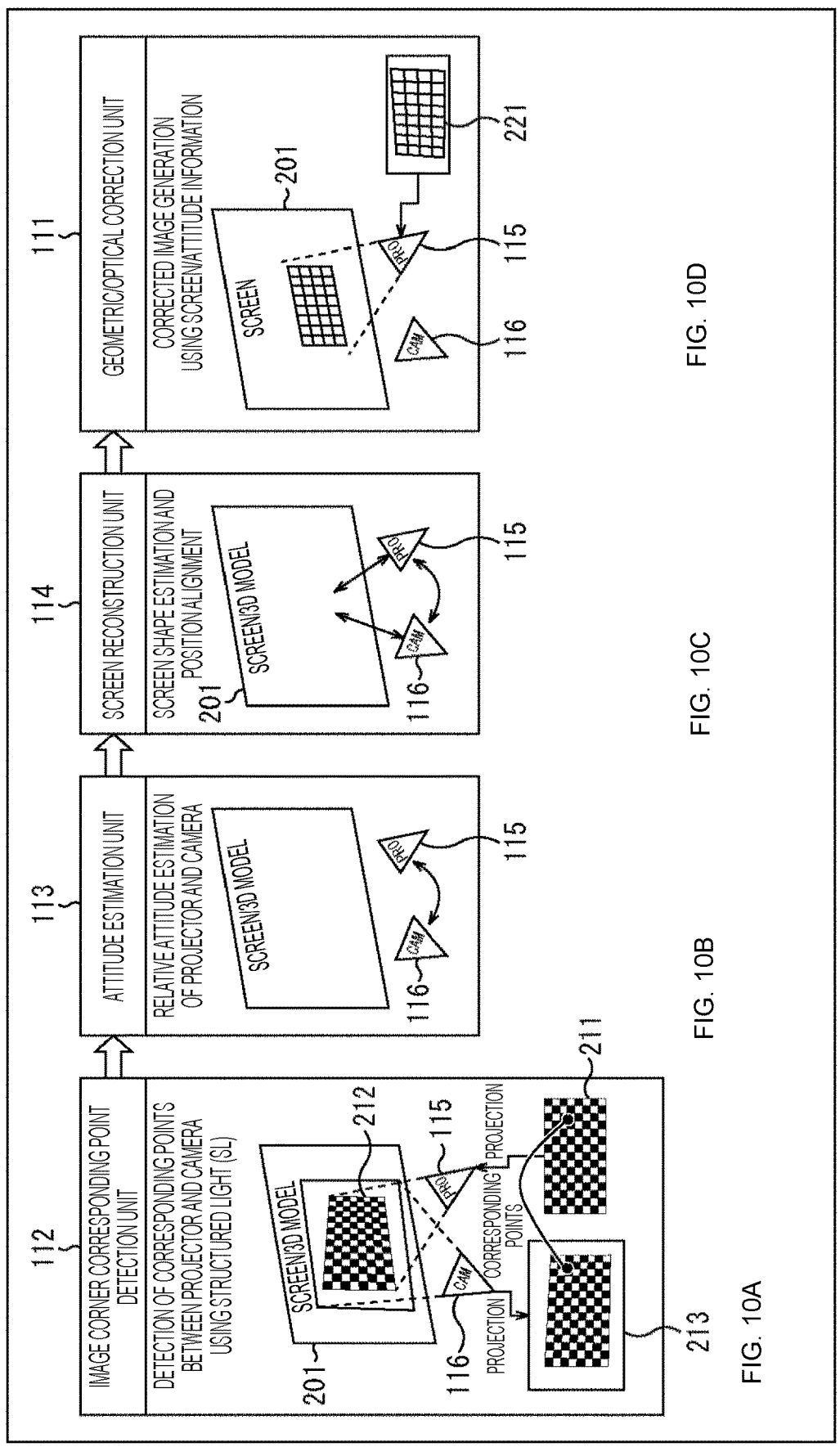
FIGS. 10A, 10B, 10C, and 10D are process charts illustrating the projection imaging processing.

More specifically, in steps S103 to S105, as illustrated in the example of FIG. 10A, an input picture 211 of the SL pattern is output by the projector 115 and a projection image 212 is projected onto a screen 201 as a detection of the corresponding points between the projector and the camera using the SL. Then, the projection image 212 and the projection image 212 projected onto the screen 201 by the camera 116 are captured, thereby generating a captured image 213. Corresponding points in the image corner between the input picture 211 and the captured image 213 are detected by the image corner corresponding point detection unit 112.

The corresponding point detector 142 supplies the detected four image corner corresponding points to the attitude estimation unit 113 and the screen reconstruction unit 114.

In step S106, the attitude estimation unit 113 performs attitude estimation. More specifically, as illustrated in FIG. 10B, the attitude estimation unit 113 estimates the relative attitude of the projector 115 and the camera 116 from the four image corner corresponding points. The attitude estimation unit 113 supplies the estimated relative attitude information regarding the projector 115 and the camera 116 to the screen reconstruction unit 114 and the geometric correction unit 111.

In step S107, the screen reconstruction unit 114 performs the position alignment with the screen. More specifically, as illustrated in FIG. 10C, the screen reconstruction unit 114 performs the estimation of the screen shape 201 and the position alignment with the screen 201 by referring to the four image corner corresponding points and the relative attitude information regarding the projector 115 and the camera 116, and supplies the result to the geometric correction unit 111 as the screen information.

In step S108, the geometric correction unit 111 generates a corrected image. More specifically, as illustrated in FIG. 10D, the geometric correction unit 111 corrects the input picture using the relative attitude information regarding the projector 115 and the camera 116 and the information associated with the screen 201 in such a manner that the input picture is correctly viewed, generates a corrected image 221, and outputs the generated corrected image 221 to the projector 115. Thereafter, the process returns to step S102, and the subsequent processing is repeated.

As described above, according to the present technology, features of an image frame and an image corner are maintained even in the case of a moving image, whereby corresponding points can be detected without synchronizing a projector with a camera.

<Variation of Present Technology>

Figure 11:
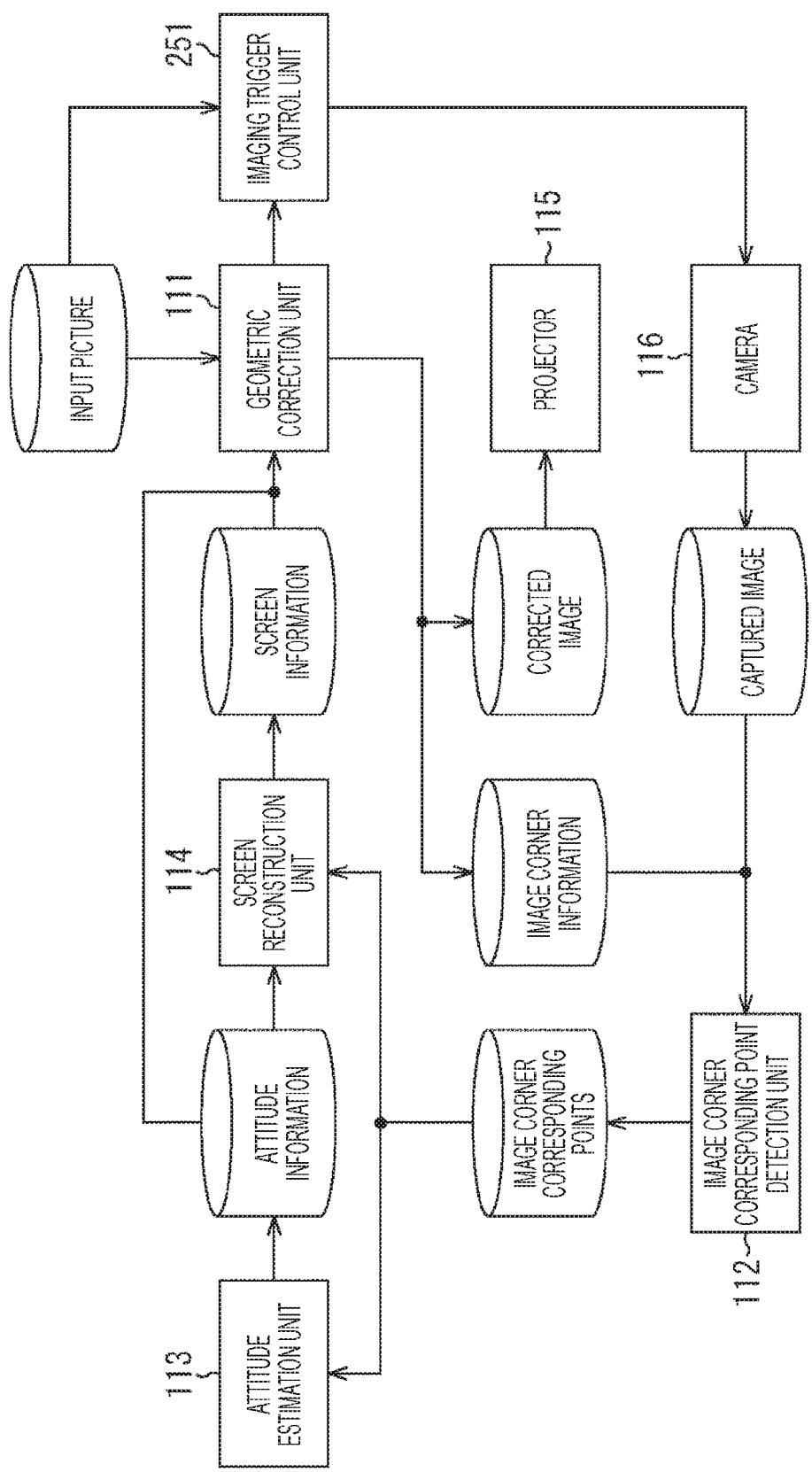
FIG. 11 is a block diagram illustrating an exemplary configuration of the projection imaging device to which the present technology is applied.

FIG. 11 is a block diagram illustrating another exemplary configuration of the projection imaging device to which the present technology is applied.

A projection imaging device 101 in FIG. 11 includes, in the same manner as the projection imaging device 101 in FIG. 4, a geometric correction unit 111, an image corner corresponding point detection unit 112, an attitude estimation unit 113, the geometric correction unit 111, a projector 115, and a camera 116.

Meanwhile, the projection imaging device 101 in FIG. 11 differs from the projection imaging device 101 in FIG. 4 in that an imaging trigger control unit 251 is added thereto.

More specifically, there may be a case where an image frame is not correctly detected depending on an input picture. For example, in a night view image or the like, an upper limit level of a picture is low, whereby an upper end image frame tends not be detected. On the other hand, the imaging trigger control unit 251 analyzes features of the input picture and controls a trigger of an imaging start of the camera 112.

For example, the imaging trigger control unit 251 performs a read ahead of the input picture and transmits an imaging trigger to the camera 116 in a case where the image frame of the input picture is likely to be detected across several frames. In order to determine whether the image frame can be detected, a level value of an image end is analyzed or meta information (whether the scene is a difficult scene to deal with, such as a night view scene) associated with the input picture is used.

Further, in an input picture having an aspect different from a general aspect, such as a movie, a black band region is added to the upper and lower sides or the right and left sides of the picture. In the case of such an input picture, it is highly likely that the black band is added throughout the story, whereby the image frame of the picture is difficult to detect.

Figure 12:
FIG. 12 is a view illustrating an example of a picture including a black band region.

Accordingly, as illustrated in FIG. 12, as a variation for analyzing features of an input picture 261, information associated with black band regions 262-1 and 262-2 (upper and lower sides of the picture in the example of FIG. 12) is applied, whereby information associated with four corners 263-1 to 263-4 in the region other than the black band can be calculated as image corner information from the input picture 261.

In a case where the picture including the black band region is captured, an image corner detection result in the image corner corresponding point detection unit 112 can be calculated from, after detecting an actual frame of the picture excluding the black band region, four intersection points of the frame.

In this manner, although four image corner points are not acquired, four corresponding points between the projector and the camera are acquired, whereby on-line sensing can be implemented.

Moreover, in a case where two or more projectors are used in an arrangement of a large-screen (large-screen arrangement), each projector projects a part of the input picture. For example, in a case where two projectors are horizontally arranged, the same region of the input picture is projected in a portion where light from the projectors overlaps, and different regions of the input picture are projected in a portion where light does not overlap.

Figure 13:
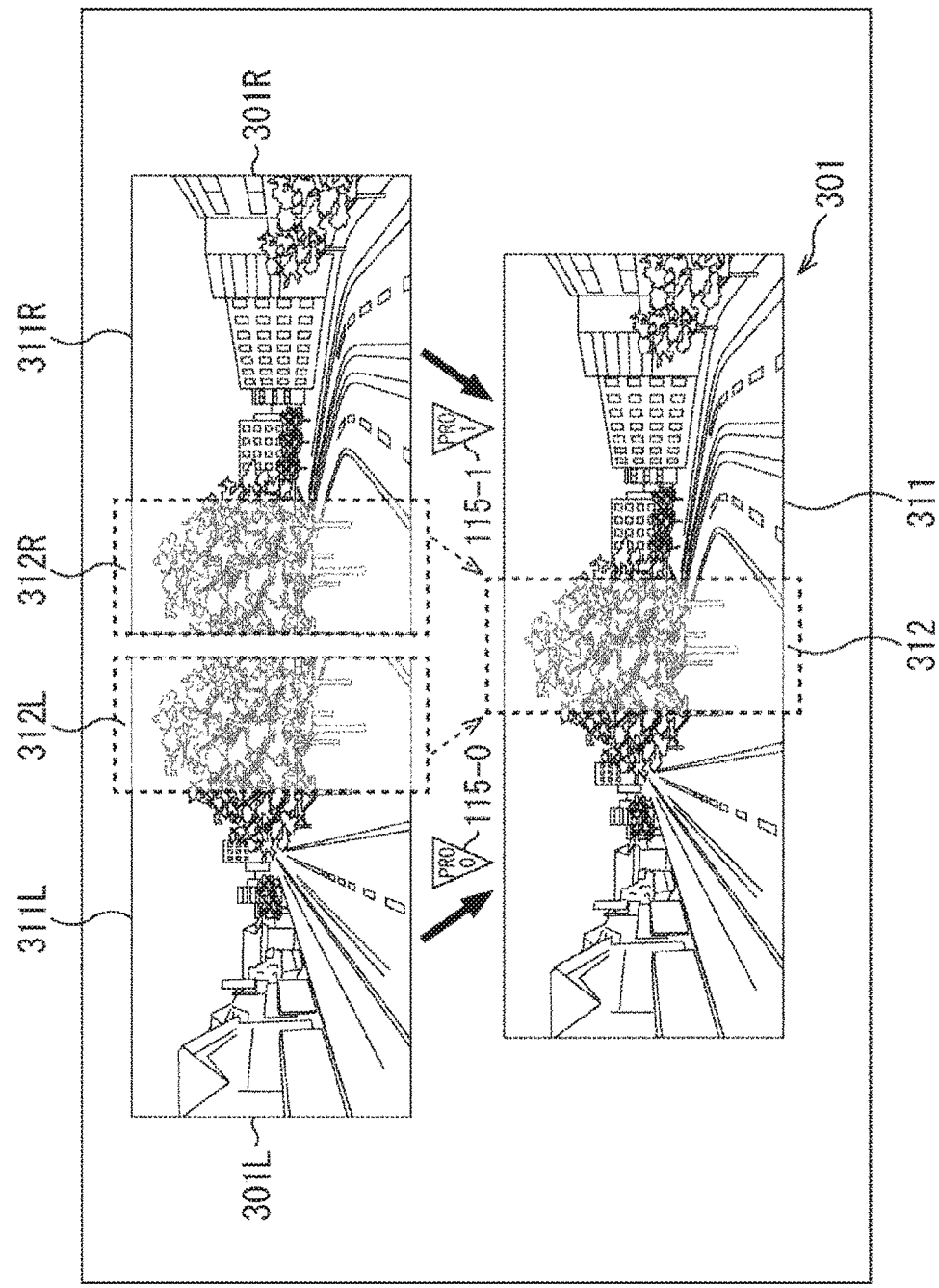
FIG. 13 is a view illustrating an exemplary case where a plurality of projectors is used in a large-screen arrangement.

For example, in the example of FIG. 13, a projector 115-0 arranged on the left side projects, within an input picture 301L, a region 311L different from each other and an overlapping region 312L. A projector 115-1 arranged on the right side projects, within an input picture 301R, a region 311R different from each other and an overlapping region 312R. Note that the overlapping region 312L and the overlapping region 312R indicate the same region.

Then, the projection from the projector 115-0 and the projection from the projector 115-1 are combined, whereby a picture 301 including a region 311 different from each other and an overlapping region 312 are projected onto the screen.

Here, in the case of a single projector, four image corner points of the input picture are projected onto the screen so that the four image corner points also exist in the captured image captured by the camera, whereby four pairs of corresponding points between the projector and the camera can be acquired. In a case where the four corresponding points on the plane screen can be acquired, attitudes of the camera 116 and the projector 115 can be estimated by the attitude estimation unit 113 using a nomography transformation or the like.

However, in a case where a plurality of projectors is used in the large-screen arrangement, each projector does not project all four image corner points of the input picture, whereby the four pairs of corresponding points cannot necessarily be acquired. In other words, only four or less pairs of corresponding points can be acquired.

In the example of FIG. 13, the corresponding points can be acquired only at two points (two points at each of left end of the region 311L different from each other and right end of the region 311R) on each of the left end and the right end for each projector. Generally, it is difficult to estimate the attitude of each projector from less than four corresponding points.

Figure 14:
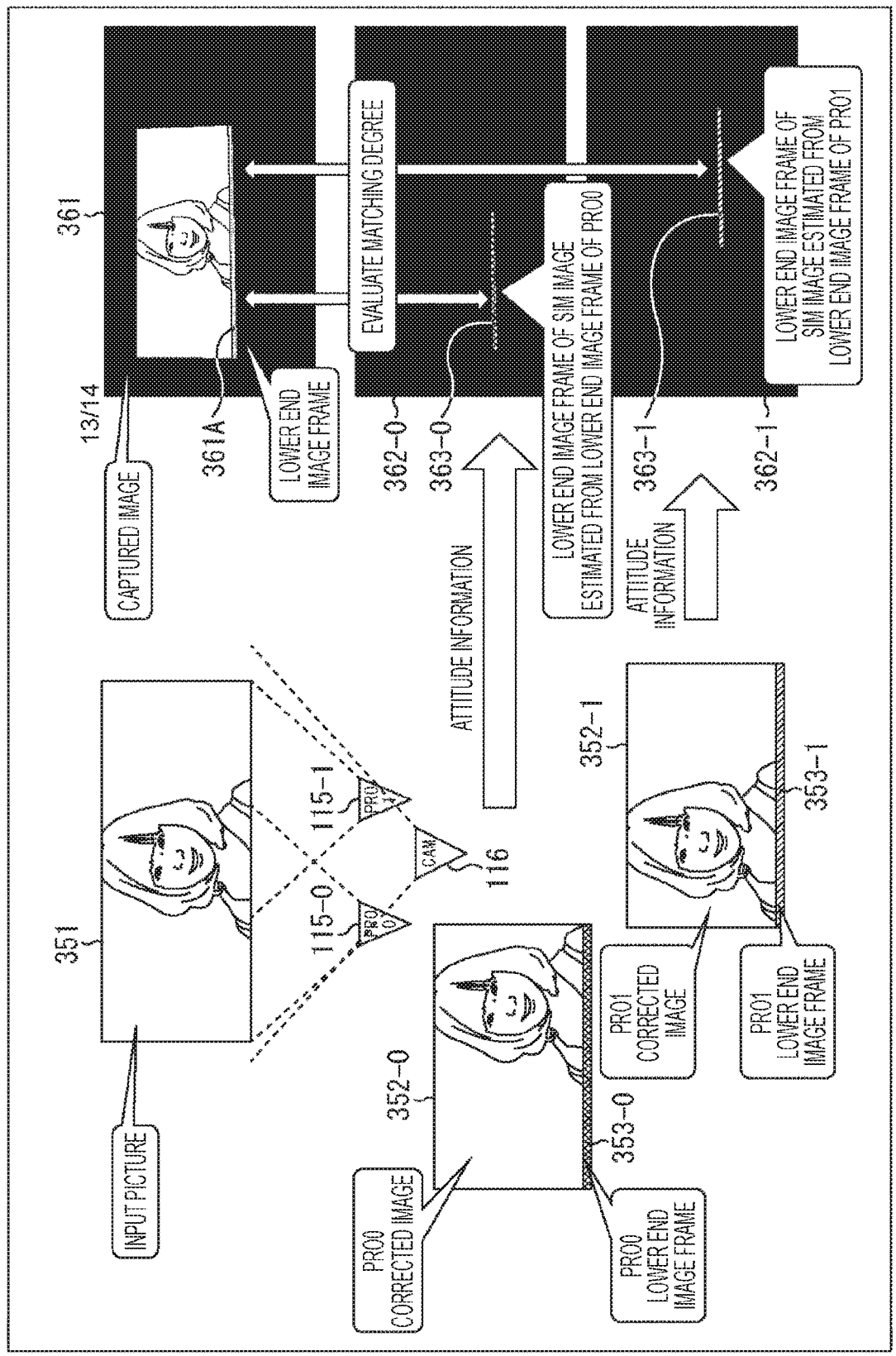
FIG. 14 is a view illustrating an exemplary case where there are less than four corresponding points.

In view of the above, in a case where there are less than four corresponding points, image frame information is to be used. The idea is that the attitude is estimated by matching the image frame of the corrected image projected by the projector and the image frame of the captured image captured by the camera. Here, an image to be obtained by capturing the corrected image by the camera using the attitude information associated with the projector and the camera is defined as an SIM image. In the case of FIG. 14, an SIM image 362-0 of a corrected image 352-0 and an SIM image 362-1 of a corrected image 352-1 are illustrated.

As illustrated in FIG. 14, for example, a degree of matching between a lower end image frame 363-0 of the SIM image 362-0, which is to be captured by the camera 116 at the attitude in which a lower end image frame 353-0 of the corrected image 352-0 exists, and a lower end image frame 361A detected from the captured image 361 is calculated. In a similar manner, a degree of matching between a lower end image frame 363-1 of the SIM image 362-1, which is to be captured by the camera 116 at the attitude in which a lower end image frame 353-1 of the corrected image 352-1 exists, and the lower end image frame 361A detected from the captured image 361 is calculated.

The degree of matching indicates an overlapping degree of the image frames, respectively. As an evaluation of the degree of matching, for example, the attitude estimation unit evaluates a proximity degree of parameters of straight lines indicating the image frame, or matches edge points in the image frame between the SIM image and the captured image.

An optimum attitude is searched by gradually changing the attitudes of the projectors 115-0 and 115-1 and the camera 116 in such a manner that the degree of matching between all image frames of the captured image 361 (upper, lower, right, and left end in the case of FIG. 14) and all image frames of the SIM image 362-0 (upper, lower, and left end in the case of FIG. 14) or all image frames of the SIM image 362-1 (upper, lower, and right end in the case of FIG. 14) becomes maximum. Examples of the method of searching include a searching and the like using a non-linear optimization such as a bundle adjustment.

In addition, since the method of matching the image frames can also be applied to the projector alone, the method can be used together with the image corner corresponding points described above. Naturally, features of the image frame are maintained even in a case where the input picture is a moving image, whereby asynchronous on-line sensing is implemented.

As described above, on-line sensing can be performed without using a specialized device in which a visible projector and a camera are synchronized with each other.

<Personal Computer>

The series of processing described above can be executed by hardware or by software. In a case where the series of processing is executed by software, a program constituting the software is installed in a computer. Here, examples of the computer include a computer incorporated in dedicated hardware, a general-purpose personal computer capable of executing various functions by installing various programs, and the like.

Figure 15:
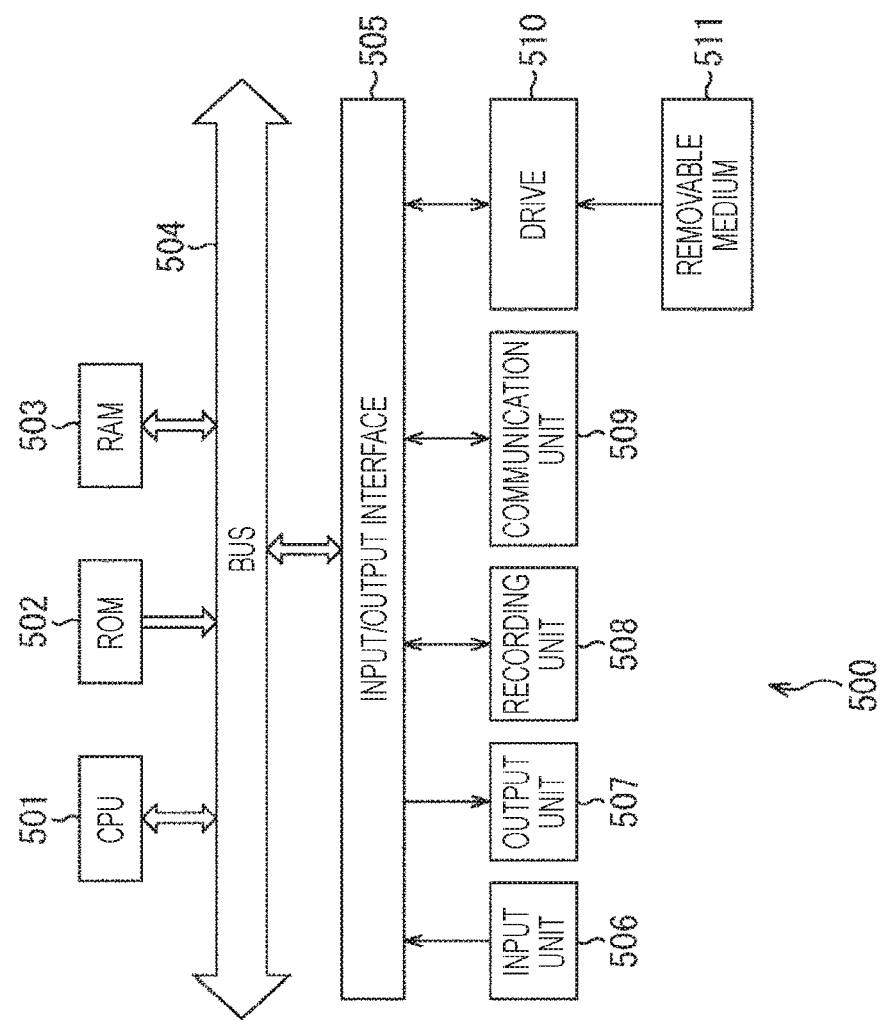
FIG. 15 is a block diagram illustrating an exemplary hardware configuration of a computer to which the present technology is applied.

FIG. 15 is a block diagram illustrating an exemplary hardware configuration of a personal computer that executes the series of processing described above using a program.

In a personal computer 500, a central processing unit (CPU) 501, a read only memory (ROM) 502, and a random access memory (RAM) 503 are coupled to one another via a bus 504.

An input/output interface 505 is further connected to the bus 504. An input unit 506, an output unit 507, a storage unit 508, a communication unit 509, and a drive 510 are connected to the input/output interface 505.

The input unit 506 includes a keyboard, a mouse, a microphone, and the like. The output unit 507 includes a display, a speaker, and the like. The storage unit 508 includes a hard disk, a non-volatile memory, and the like. The communication unit 509 includes a network interface, and the like. The drive 510 drives a removable medium 511 such as a magnetic disk, an optical disk, a magneto-optical disk, and a semiconductor memory.

In the personal computer 500 configured as described above, for example, the CPU 501 loads the program stored in the storage unit 508 into the RAM 503 via the input/output interface 505 and the bus 504 and executes the program. In this manner, the series of processing described above is executed.

A program to be executed by the computer (CPU 501) may be recorded in the removable medium 511 for provision thereof. The removable medium 511 is, for example, a package media or the like including a magnetic disk (including a flexible disk), an optical disk (compact disc read only memory (CD-ROM) or a digital versatile disc (DVD), for example), a magneto-optical disk, a semiconductor memory, and the like. Further, alternatively, the program may be provided through a wired or wireless transmission medium such as a local area network, the internet, and digital satellite broadcasting.

In the computer, the program may be installed in the storage unit 508 via the input/output interface 505 by attaching the removable medium 511 to the drive 510. Moreover, the program may be received by the communication unit 509 via a wired or wireless transmission medium and installed in the storage unit 508. In addition, the program may be installed in the ROM 502 or the storage unit 508 in advance.

It should be noted that the program executed by the computer may be a program in which processing is executed in a time-series manner according to the order described in the present specification, or may be a program in which processing is executed in parallel or in a necessary step such as a calling is performed.

Moreover, in the present specification, steps for writing a program to be recorded in a recording medium are not only the processing executed in a time-series manner according to the described order, but also processing executed in parallel or individually without necessarily being processed in a time-series manner.

Besides, in the present specification, the system indicates an apparatus as a whole including a plurality of devices (apparatuses).

For example, the present disclosure may employ a configuration of cloud computing in which one function is shared and jointly processed by a plurality of devices via a network.

Moreover, in the descriptions above, the configuration described as one device (or processing unit) may be divided and configured as a plurality of devices (or processing units). To the contrary, in the descriptions above, configurations described as a plurality of devices (or processing units) may be collectively configured as one device (or processing unit). Further, configurations other than those described above may be added to the configuration of each device (or each processing unit). Furthermore, as long as the configuration and operation of the system as a whole are substantially the same, a part of the configuration of a certain device (or processing unit) may be included in the configuration of another device (or another processing unit). That is, the present technology is not limited to the embodiments described above, and various modifications are possible without departing from the gist of the present technology.

As described above, although the preferred embodiments of the present disclosure have been described in detail with reference to accompanying drawings, the present disclosure is not limited to such examples. It is obvious that those skilled in the art to which the present disclosure pertains may find various alterations and modifications within the scope of the appended claims, and it should be understood that such alterations and modifications are also naturally within the technical scope of the present disclosure.

Note that the present technology can also employ the following configurations.

(1) An image processing apparatus, including: a correction unit that generates a corrected image by correcting an input image on the basis of attitude estimation information indicating an attitude estimation result of a projector;

an image corner correspondence detection unit that detects image corner corresponding points by associating an image corner point of a captured image with an image corner point of the corrected image, the captured image being generated in such a manner that the corrected image corrected by the correction unit is projected by the projector and a projection image is captured; and an attitude estimation unit that generates the attitude estimation information by estimating an attitude of the projector on the basis of the image corner corresponding points detected by the image corner correspondence detection unit.

(2) The image processing apparatus according to above-described (1), further including:

an imaging unit that generates the captured image by capturing the projection image that is the corrected image corrected by the correction unit and projected by the projector.

(3) The image processing apparatus according to above-described (1) or (2), further including:

an imaging trigger control unit that performs a read ahead of the input image and transmits an imaging trigger to the imaging unit in a case where an image frame can be detected.

(4) The image processing apparatus according to any one of above-described (1) to (3), further including:

a black band detection unit that detects a black band in the input image, in which the image corner point of the corrected image is determined from a region other than the black band in a case where the black band is detected by the black band detection unit.

(5) The image processing apparatus according to above-described (4), in which the attitude estimation unit estimates the attitude of the projector by evaluating a degree of matching between an image frame of the corrected image and an image frame of the captured image in a case where there are less than four image corner points of the corrected image.

(6) The image processing apparatus according to above-described (5), in which the attitude estimation unit estimates the attitude of the projector by evaluating, as the evaluation of the degree of matching, a proximity degree of parameters of straight lines indicating the image frame.

(7) The image processing apparatus according to above-described (5), in which the attitude estimation unit estimates the attitude of the projector by matching, as the evaluation of the degree of matching, edge points in the image frame between an image to be obtained by capturing the corrected image by the imaging unit using the attitude estimation information and the captured image.

(8) A method of processing image, the method using an image processing apparatus, including:

generating a corrected image by correcting an input image on the basis of attitude estimation information indicating an attitude estimation result of a projector;

detecting image corner corresponding points by associating an image corner point of a captured image with an image corner point of the corrected image, the captured image being generated in such a manner that the corrected image is projected by the projector and a projection image is captured; and generating the attitude estimation information by estimating an attitude of the projector on the basis of the detected image corner corresponding points.

(9) A program for causing a computer to function as:

a correction unit that generates a corrected image by correcting an input image on the basis of attitude estimation information indicating an attitude estimation result of a projector;

an image corner correspondence detection unit that detects image corner corresponding points by associating an image corner point of a captured image with an image corner point of the corrected image, the captured image being generated in such a manner that the corrected image corrected by the correction unit is projected by the projector and a projection image is captured; and an attitude estimation unit that generates the attitude estimation information by estimating an attitude of the projector on the basis of the image corner corresponding points detected by the image corner correspondence detection unit.

REFERENCE SIGNS LIST 101 projection imaging device
111 geometric correction unit
112 image corner corresponding point detection unit
113 attitude estimation unit
114 screen reconstruction unit
115, 115-0, 115-1 projector
116 camera
141 image corner detector
142 corresponding point detector
151 edge detection unit
152 Hough transform unit
153 clustering unit
154 deviating line removal unit
155 image frame detection unit
251 imaging trigger control unit

The invention claimed is:

1. An image processing apparatus, comprising:
   a correction unit configured to correct an input image to generate a corrected image, wherein
      the correction of the input image is based on attitude estimation information indicating an attitude estimation result of a projector, and
      the projector projects the corrected image;
   an image corner correspondence detection unit configured to detect image corner corresponding points based on association of an image corner point of a captured image with an image corner point of the corrected image;
   an attitude estimation unit configured to estimate an attitude of the projector to generate the attitude estimation information, wherein the estimation of the attitude of the projector is based on the image corner corresponding points; and
   an imaging trigger control unit configured to:
      execute a read ahead of the input image; and
      transmit an imaging trigger to an imaging unit based on a detection of an image frame of the input image.

2. The image processing apparatus according to claim 1, further comprising the imaging unit configured to:
   capture the projected image; and
   generate the captured image based on the capture of the projected image.

3. The image processing apparatus according to claim 1, further comprising:
   a black band detection unit configured to detect a black band in the input image, wherein
      the image corner point of the corrected image is determined from a region different from the black band, and
      the determination of the image corner point of the corrected image is based on the detection of the black band.

4. The image processing apparatus according to claim 3, wherein the attitude estimation unit is further configured to:
   evaluate a degree of matching between an image frame of the corrected image and an image frame of the captured image, wherein the corrected image includes less than four image corner points; and
   estimate the attitude of the projector based on the evaluation of the degree of matching.

5. The image processing apparatus according to claim 4, wherein the attitude estimation unit is further configured to:
   evaluate, as the evaluation of the degree of matching, a proximity degree of parameters of straight lines indicating the image frame of the captured image; and
   estimate the attitude of the projector based on the evaluation of the proximity degree of parameters of the straight lines.

6. The image processing apparatus according to claim 4, wherein
   the attitude estimation unit is further configured to estimate the attitude of the projector based on match between edge points in an image frame of an image and edge points in the image frame of the captured image, the match corresponds to the evaluation of the degree of matching, the imaging unit is further configured to generate the image based on capture of the corrected image, and the capture of the corrected image is based on the attitude estimation information.

7. An image processing method, comprising:

in an image processing apparatus:
- correcting an input image for generating a corrected image, wherein
  - the correction of the input image is based on attitude estimation information indicating an attitude estimation result of a projector, and
  - the projector projects the corrected image;
- detecting image corner corresponding points based on association of an image corner point of a captured image with an image corner point of the corrected image;
- estimating an attitude of the projector for generating the attitude estimation information, wherein the estimation of the attitude of the projector is based on the detected image corner corresponding points;
- executing a read ahead of the input image; and
- transmitting an imaging trigger to an imaging unit based on a detection of an image frame of the input image.

* * * * *